(12) United States Patent
Ren et al.

(10) Patent No.: US 7,057,326 B2
(45) Date of Patent: Jun. 6, 2006

(54) ROTOR BODY CONTAINMENT SHELL WITH REDUCED WINDAGE LOSSES

(75) Inventors: Wei-Min Ren, Niskayuna, NY (US); Ralph James Carl, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 10/250,031

(22) Filed: May 29, 2003

(65) Prior Publication Data

US 2004/0239208 A1   Dec. 2, 2004

(51) Int. Cl.
*H02K 1/22*   (2006.01)

(52) U.S. Cl. .................. 310/261; 310/271; 310/156.28

(58) Field of Classification Search ................ 310/261, 310/262, 271, 156.23, 156.28, 156.29, 156.31
See application file for complete search history.

(56) References Cited

U.S. PATENT DOCUMENTS

| | | | |
|---|---|---|---|
| 1,912,586 A * | 6/1933 | Lysholm ...................... 310/61 |
| 3,571,637 A * | 3/1971 | Henningsen et al. ... 310/156.72 |
| 4,146,804 A * | 3/1979 | Carr, Jr. ........................ 310/52 |
| 4,409,506 A * | 10/1983 | Ito et al. ..................... 310/166 |
| 4,449,965 A | 5/1984 | Strain .......................... 494/16 |
| 4,518,218 A * | 5/1985 | Diepeveen .................. 359/217 |
| 4,644,210 A * | 2/1987 | Meisner et al. ............. 310/211 |
| 4,674,178 A * | 6/1987 | Patel ........................... 29/598 |
| 4,933,581 A * | 6/1990 | Shramo ....................... 310/86 |
| 5,744,887 A * | 4/1998 | Itoh ....................... 310/156.28 |
| 6,144,130 A * | 11/2000 | Kawamura ............. 310/156.28 |
| 6,285,110 B1 | 9/2001 | Tong et al. .................. 310/270 |
| 6,345,433 B1 * | 2/2002 | Kliman et al. ................ 29/598 |
| 6,346,755 B1 | 2/2002 | Tong et al. ................... 310/58 |
| 6,452,294 B1 | 9/2002 | Vandervort et al. ........... 310/64 |
| 6,477,773 B1 | 11/2002 | Wilson et al. ................ 29/889 |
| 6,657,348 B1 * | 12/2003 | Qin et al. .............. 310/156.28 |

FOREIGN PATENT DOCUMENTS

JP   11-150896   *   6/1999

\* cited by examiner

*Primary Examiner*—Dang Le
(74) *Attorney, Agent, or Firm*—Nixon & Vanderhye, P.C.

(57) ABSTRACT

A rotor body assembly includes a rotor and a containment shell surrounding the rotor, the containment shell having an external peripheral surface provided with a plurality of surface deformations.

3 Claims, 2 Drawing Sheets

ROTOR BODY CONTAINMENT SHELL WITH REDUCED WINDAGE LOSSES

BACKGROUND OF INVENTION

This invention relates to the construction of high speed generators and, specifically, to a rotor containment shell designed to reduce windage losses.

More specifically, a high speed generator typically includes a rotor, stator, rotor support, system and other components. The rotor typically comprises a forging in combination with a permanent magnet or a wound field winding that generates the magnetic field. Outside the permanent magnetic or field winding, a containment shell, typically made of a metallic material combined with an organic fiber reinforced material (or a combination of the two), is required to contain the rotor components against centrifugal forces.

When air is used as a primary cooling media in high speed motors and generators where rotor peripheral velocities exceed 475 feet per second, windage losses becomes comparable to, or even larger than, electrical losses (when a smooth surface rotor is applied). Higher windage loss results in higher temperatures in the rotor body and cooling gas inside the air gap. Careful management of the windage loss is critical to insure the success of an air cooled machine. In the past, air-cooled arrangements have oftentimes not been adopted because windage loss was too high to meet efficiency targets. In such cases, air cooling was replaced typically by more costly water cooling arrangements. In small machines the space between the rotor and stator is evacuated to reduce windage. But this is only practical for water cooled machines of power ratings too small to be used in distributed power generation.

Axial flow results in a significant increase of windage loss. Studies show that as axial flow increases, the axial velocity gradient increases while the swirl velocity distribution remains similar. This results in an increase of windage.

SUMMARY OF INVENTION

This invention focuses on windage loss reduction and heat transfer enhancement for air cooled, high speed motors and generators. The invention applies to configurations with either a permanent magnet or a wound field rotor. The rotor body containment shell features a plurality of annular or axial concavities (or other surface deformations). In one exemplary embodiment of the invention, the outer cylindrical shell surface is formed with a plurality of concavities in the form of annular turbulator grooves axially spaced from one another along the length of the rotor. In an alternative arrangement, the concavities may be in the form of axially extending grooves that are circumferentially spaced about the rotor. Other shapes and/or patterns of shapes may be employed and will be described in further detail hereinbelow, recognizing that the goal is to decrease the amount of flat, cylindrical surface area on the shell exterior surface.

Accordingly, in its broader aspects, the present invention relates to a rotor body assembly comprising a rotor and a containment shell surrounding the rotor, the containment shell having an external peripheral surface provided with a plurality of surface deformations for reducing windage loss.

In another aspect, the present invention relates to a generator comprising a rotor, a stator surrounding the rotor and a support system for supporting the rotor for rotation within the stator; the rotor provided with a field winding and an outer containment shell, the containment shell having an external peripheral surface provided with a plurality of surface deformations.

The invention will now be described in detail in connection with the drawings identified below.

DETAILED DESCRIPTION

Figure 1:
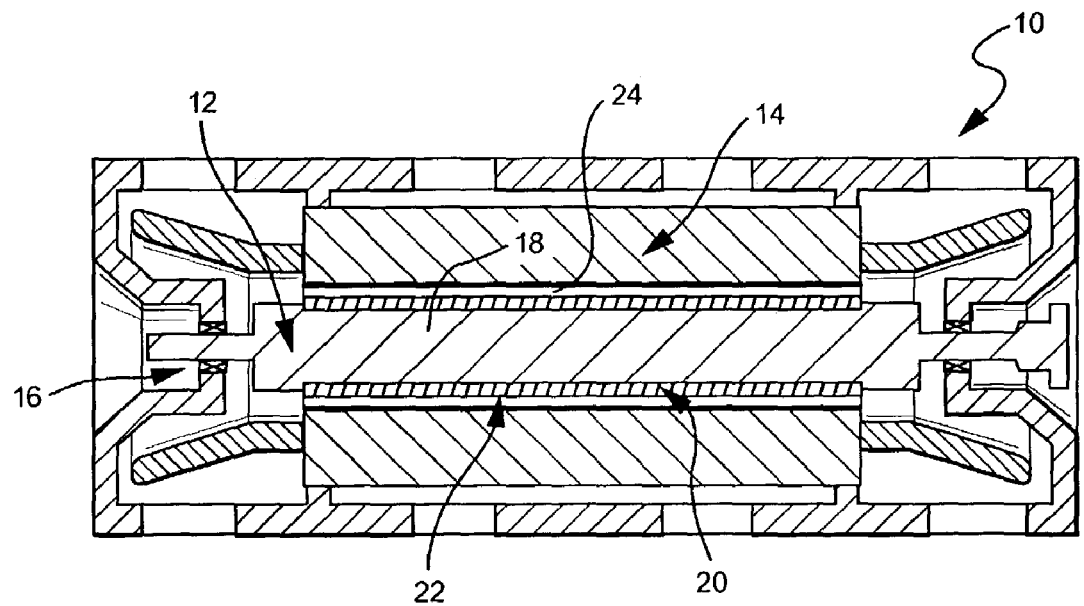
FIG. 1 is a schematic side elevation of a high speed generator.

Referring initially to FIG. 1, a high speed generator 10 typically includes a rotor 12, a stator 14, and a rotor support system 16. The rotor 12 includes a forging 18 and a permanent magnet (or a wound field) 20 that generates the magnetic field. Radially outside the permanent magnet or wound field, there is a containment shell 22 that surrounds the rotor. Typically, cooling air flows in the radial gap 24 between the rotor 12 (including the containment shell) and the stator 14.

Figure 2:
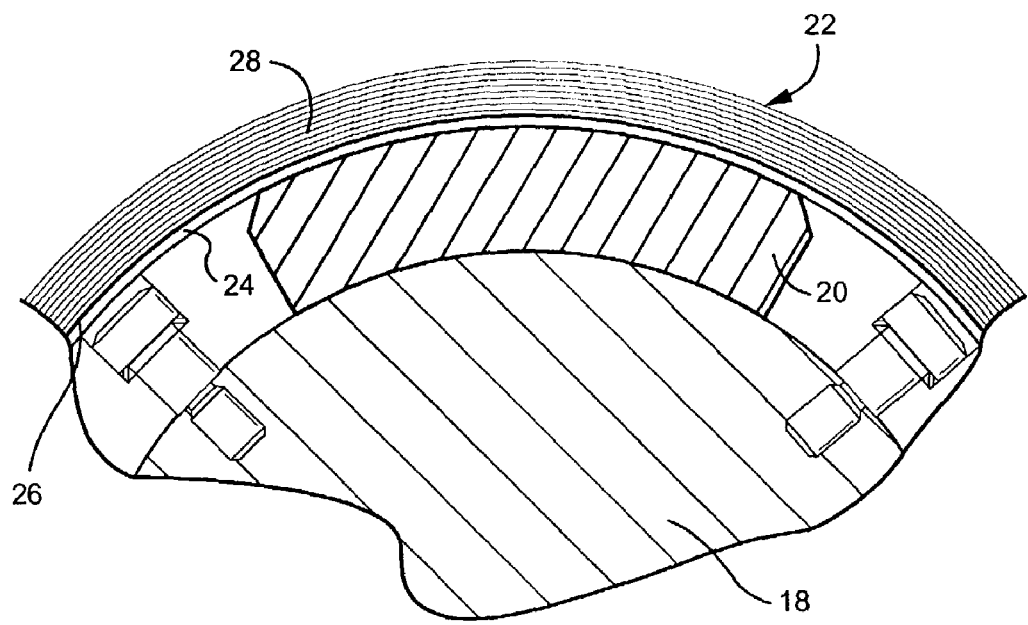
FIG. 2 is a partial cross sectional view of the rotor taken from FIG. 1, illustrating a typical containment shell surrounding the rotor.

The generator rotor containment shell 22 may be formed of a suitable metallic material (e.g., aluminum or inconel), an organic fiber reinforced material, or a combination of the two. Turning to FIG. 2, the containment shell 22 may be formed by a radially inner aluminum (or other suitable metal) component 26 for stress distribution and electromagnetic shielding, surrounded by an organic fiber reinforced matrix material jacket 28. In all cases, the shell must be sufficiently strong to contain the rotor components against the centrifugal forces arising from rotation of the rotor during operation.

Figure 7:
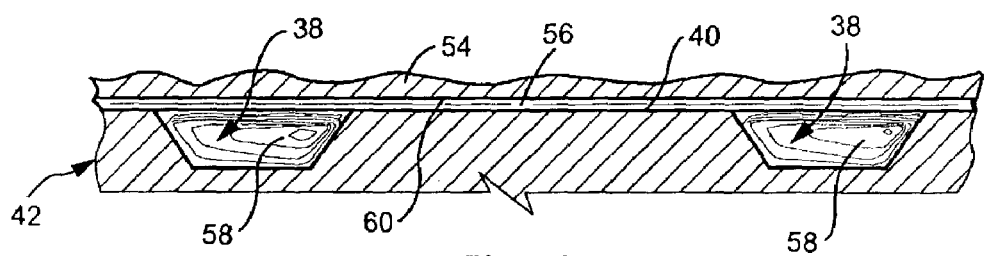
FIG. 7 is a partial cross-sectional detail showing axial flow circulation between a stator and a rotor having tapered annular rings of the kind shown in FIG. 5.

In the present invention, and with reference also to FIG. 3, the outer surface 28 of the containment shell 22 may be provided with a plurality of surface concavities such as annular turbulator grooves or other suitable surface deformations as described below. In one embodiment (FIG. 3), these concavities are in the form of annular grooves 30 axially spaced along the length of the rotor. The grooves 30 will enhance the local air mixing, improve the axial heat transfer, reduce windage loss, and reduce the heat penetration from the heat generated by windage into the rotor body. This arrangement, or similar arrangement discussed below in connection with FIG. 7, is especially beneficial when the flow direction across the rotor is predominantly axial, i.e., parallel to the axis of rotation of the rotor. The optimal depth of the groove depends on a tradeoff between increased resistance to tangential motion and decreased resistance to axial flow.

Figure 4:
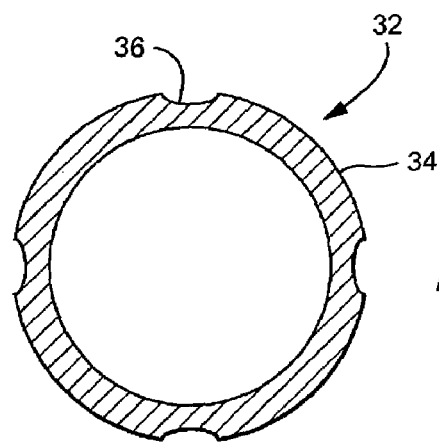
FIG. 4 is a schematic end elevation of a generator rotor containment shell having axially extending concave grooves in accordance with another exemplary embodiment of the invention.

FIG. 4 illustrates an alternative arrangement where the shell 32 has an outer surface 34 formed with a plurality of longitudinally extending concave grooves 36 spaced circumferentially about the shell. This arrangement provides good windage reduction results when the flow swirls about the rotor.

Figure 3:
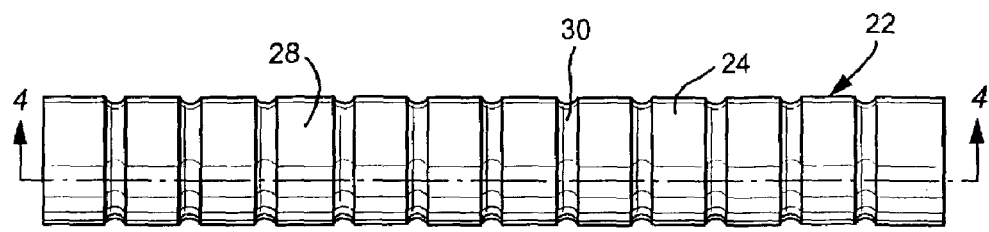
FIG. 3 is a schematic side elevation of a generator rotor containment shell having a plurality of annular concave grooves formed in an external surface thereof in accordance with an exemplary embodiment of the invention.
Figure 5:
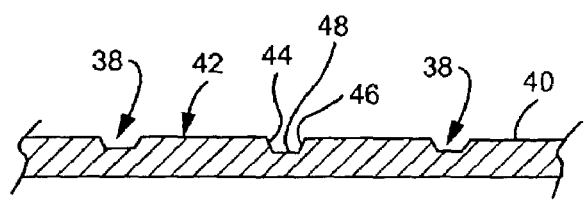
FIG. 5 is a partial cross section through a generator rotor containment shell illustrating a plurality of axially spaced annular tapered grooves in accordance with still another exemplary embodiment of the invention.

FIG. 5 illustrates yet another arrangement, generally similar to FIG. 3, but wherein annular grooves 38 in the outside surface 40 of the shell 42 are each comprised of flat tapering side surfaces 44, 46 and a flat base 48.

Figure 6:
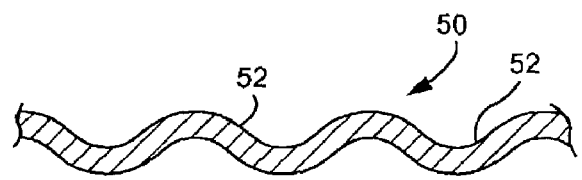
FIG. 6 is a partial cross section through a generator rotor containment shell illustrating a sine-wave like cross-sectional shape of a rotor wall in accordance with yet another embodiment of the invention.

FIG. 6 illustrates yet another configuration where the shell 50 is formed with an undulating or sine-wave shaped cross-section to thereby create generally annular, closely spaced concave surface deformations or grooves 52. This arrangement, like those ion FIGS. 3 and 5 are most effective when the flow direction is predominantly axial.

FIG. 7 is an enlarged detail of the shell 42 of FIG. 5, located adjacent a fixed stator 54, with a radial gap 56 therebetween. The tapered grooves 38 are in close radial proximity to the stator 54, and flow between the rotor and stator in this example is predominantly in the axial direction. The inventor has discovered that by providing such deformations (grooves) 38 on the outside surface of the shell 42, windage loss is reduced because the pockets of air 58 caught within the grooves 38 cause less resistance, i.e., friction, to the flow of air through the gap 56, than if the gap were defined solely by flat cylindrical facing surfaces 60, 40 on the stator 54 and on the containment shell 42, respectively. Stated otherwise, the windage or friction loss is proportional to the flat outer cylindrical surface area of the containment shell. This means that as the smooth cylindrical surface area is reduced, so is the windage loss. Of course, the surface deformations cannot be so great as to negatively impact the integrity of the shell. It will be understood, however, that it is within the skill of the art to optimize the deformation shapes and patterns of shapes on the outer surface of the shell to obtain the best results. Further in this regard, other surface deformations such as concave dimples or the like may be used effectively to reduce windage loss.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended

The invention claimed is:

1. An air-cooled generator comprising a rotor, a stator surrounding said rotor and a support system for supporting said rotor for rotation within said stator; said rotor provided with a permanent magnet or field winding and an outer containment shell sufficiently strong to contain said field winding against centrifugal forces during rotation of said rotor, said containment shell having an external peripheral surface provided with a plurality of discrete, adjacent grooves, wherein said adjacent grooves on said external peripheral surface have a sine-wave shape in cross section for reducing windage loss due to rotor rotation.

2. The generator of claim 1 wherein said external peripheral surface is polished to further reduce windage loss.

3. The generator of claim 1 wherein said rotor is a superconducting rotor.

* * * * *

UNITED STATES PATENT AND TRADEMARK OFFICE
CERTIFICATE OF CORRECTION

| | | |
|---|---|---|
| PATENT NO. | : 7,057,326 B2 | Page 1 of 1 |
| APPLICATION NO. | : 10/250031 | |
| DATED | : June 6, 2006 | |
| INVENTOR(S) | : Ren et al. | |

It is certified that error appears in the above-identified patent and that said Letters Patent is hereby corrected as shown below:

Col. 4, line 16 after the word "appended" insert the word --claims.--

Signed and Sealed this

Twenty-sixth Day of September, 2006

JON W. DUDAS
*Director of the United States Patent and Trademark Office*